Feb. 11, 1936. W. F. COSTELLO 2,030,138
TOOL SET AND CONTAINER THEREFOR
Filed June 19, 1935 2 Sheets-Sheet 1
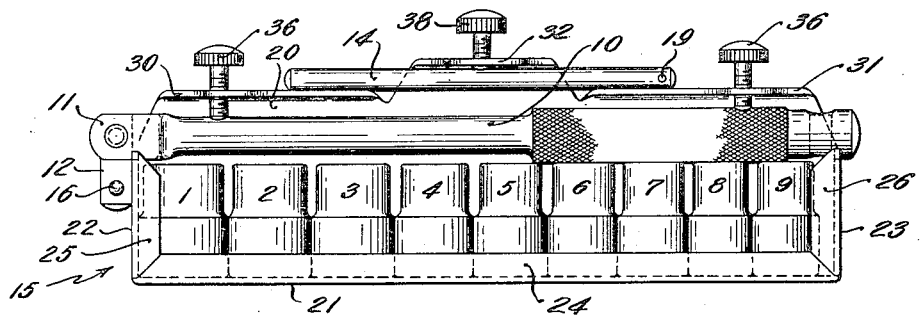
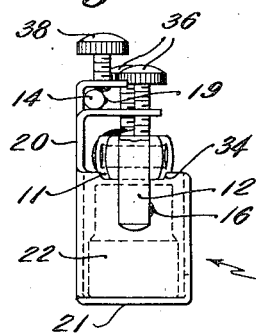 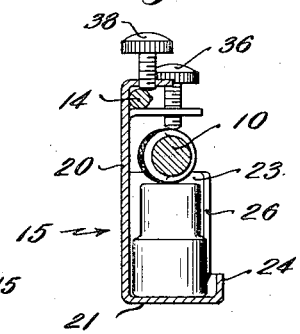 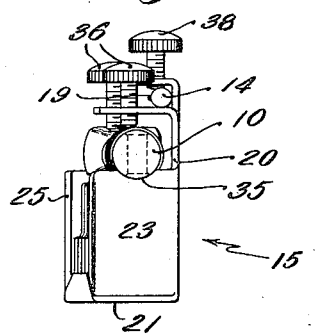
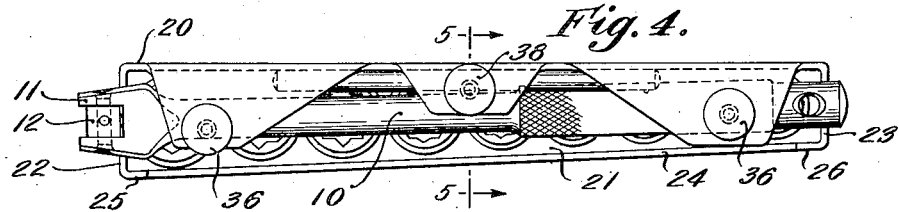
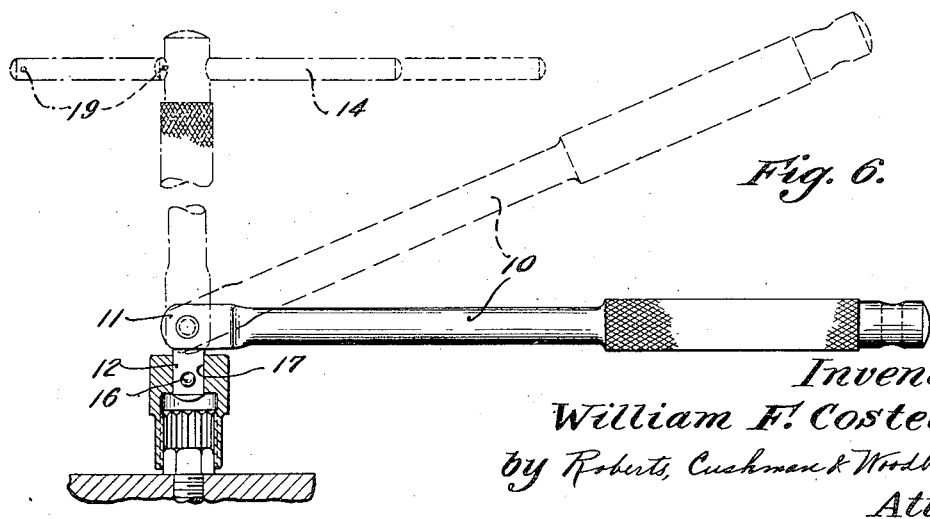
Inventor,
William F. Costello,
by Roberts, Cushman & Woodbury.
Attys.

Feb. 11, 1936.  W. F. COSTELLO  2,030,138
TOOL SET AND CONTAINER THEREFOR
Filed June 19, 1935   2 Sheets-Sheet 2
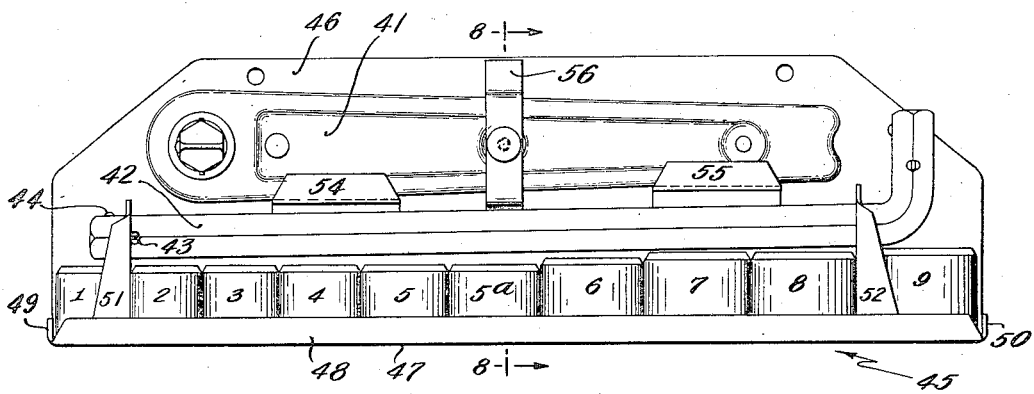
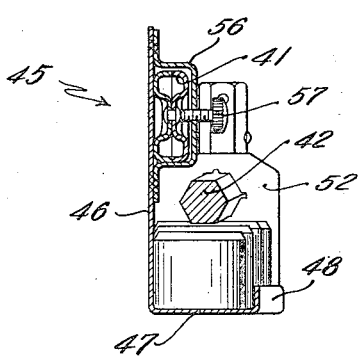
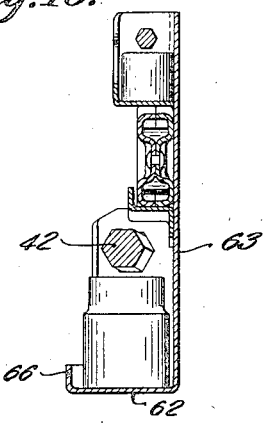
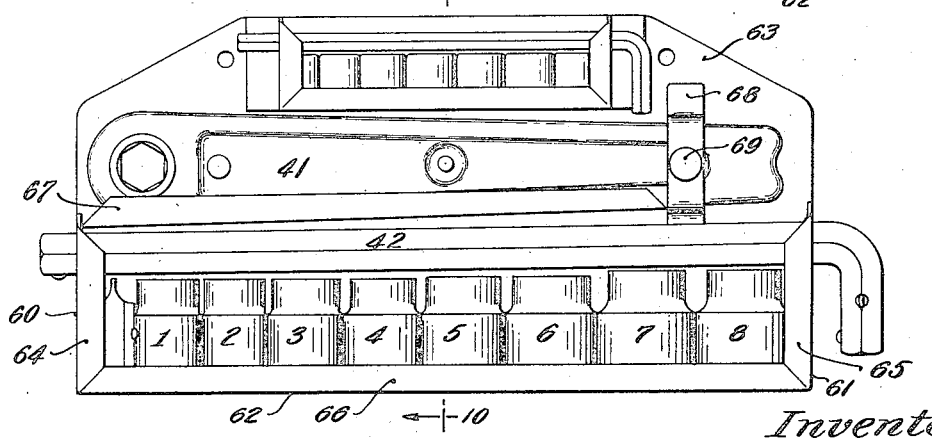
Inventor,
William F. Costello,
by Roberts, Cushman & Woodbury.
Attys.

Patented Feb. 11, 1936

2,030,138

UNITED STATES PATENT OFFICE 2,030,138

TOOL SET AND CONTAINER THEREFOR

William F. Costello, New Britain, Conn., assignor to The New Britain Machine Company, New Britain, Conn., a corporation of Connecticut Application June 19, 1935, Serial No. 27,410

6 Claims. (Cl. 206—16)

This invention relates to compound tool sets and to a container or holder for a compound tool of the type comprising one or more operating members, a number of detachable heads and means for connecting the heads to the operating members, a socket wrench set being representative of tools of this general class.

The principal objects of the invention are to provide an improved holder for the detachable heads, operating handle and other parts or adjuncts of the complete tool; to provide an efficient holder which is of strong and durable construction, having but few parts; and to provide a holder which is of simple design and inexpensive to manufacture and which is so designed that the various parts of the tool sets may be withdrawn and replaced quickly and conveniently.

Further objects relate to various features of construction and will be apparent from a consideration of the following description and accompanying drawings, wherein:

Fig. 1 is a front elevation of a tool set constructed in accordance with the present invention;

Figs. 2 and 3 are end elevations of the tool set shown in Fig. 1;

Fig. 4 is a top plan view of the tool set shown in Fig. 1;

Fig. 5 is a section on the line 5—5 of Fig. 4;

Fig. 6 is an elevation of the operating member connected to one of the detachable heads and illustrating the manner of using the assembled tool;

Fig. 7 is a front elevation of a tool set of modified construction;

Fig. 8 is a section on the line 8—8 of Fig. 7;

Fig. 9 is a front elevation showing a further modification; and

Fig. 10 is a section on the line 10—10 of Fig. 9.

Referring to Figs. 1 to 6, the tool set shown therein comprises a plurality of detachable heads or sockets 1 to 9, and an operating member on handle 10 having a bifurcated end 11 to which an adapter or extension 12 is pivotally connected, a lever 14 adapted for connection with the opposite end of the handle 10, and a container or holder, designated generally by the numeral 15, for holding the compound tool set. The free end of the extension 12 is shaped to fit each of the sockets 1 to 9 and is provided with a spring-pressed ball 16 which normally extends beyond the adjacent outer surface of the extension member and provides a yieldable means for engaging the inner periphery of the opening 17 on the inside of each socket, as shown in Fig. 6.

The opposite end of the operating handle 10 is provided with a transversely extending opening through which the lever 14 may be inserted, as shown in Fig. 6, and one end of the lever 14 is provided with a nib 19 which prevents it from being drawn all the way through the opening 18.

The container 15 preferably is made from a single piece of sheet metal and comprises an elongate rear wall 20, a bottom wall 21, and end walls 22 and 23, each integral with the rear wall 20. The front edge of the bottom wall 21 and the lateral edges of the side walls 22 and 23 are provided with inwardly directed flanges 24, 25 and 26, respectively, which retain the socket elements 1 to 9 within the compartment defined by the rear, bottom and end walls.

The top of the rear wall 20 is shaped to provide generally triangular ears which are bent inwardly at right angles to the body portion of the rear wall so as to provide brackets 30 and 31 adjacent to the ends of the rear wall, and an intermediate bracket 32 located above and between the brackets 30 and 31. The upper end of the side wall 22 is provided with a rectangular notch 34 (Fig. 2) in which the bifurcated end of the operating handle 10 snugly fits, and the upper end of the side wall 23 is provided with an arcuate recess 35 in which the opposite end of the handle fits. The parts are so designed that the brackets 30 and 31 overhang the handle 10 when disposed on the end walls of the container, as shown in Fig. 4, and each of these brackets is provided with a set screw 36 engageable with the handle 10 to lock it firmly in position.

The brackets 30, 31 and 32 are arranged to define a compartment for the reception of the lever 14, and the bracket 32 is provided with a set screw 38 which is engageable with the lever 14 to lock it against the upper surfaces of brackets 30 and 31 when disposed in the compartment defined by these members.

When the sockets 1 to 9 are disposed in the main compartment and the operating handle 10 supported on the end walls 22 and 23, as shown in Figs. 1 to 5, both the handle and sockets may be securely locked in place by the set screws 36, it being noted that the handle 10 extends along the tops of the sockets and thus holds them in place. In a similar manner the lever 14 is locked in place by the set screw 38 and thus the entire tool set may be locked within the container by a simple manipulation of the set screws 36 and 38.

Referring to Figs. 7 and 8, the embodiment shown therein comprises a tool set including a plurality of of sockets 1 to 9, an operating handle 41, an extension 42, etc., of the type shown in my Patent No. 1,826,739, and a container, designated generally by the numeral 45, which is somewhat similar to that shown in the previously described embodiment. The container 45 is preferably of sheet metal bent or shaped to provide a rear wall 46 and a bottom wall 47 which is formed with a retaining flange 48 on its longitudinal edge and similar flanges 49 and 50 on its ends. Spaced inwardly from the flanges 49 and 50 are upstanding brackets 51 and 52, the bracket 51 being spaced from the flange 49 a distance slightly greater than the diameter of the socket 1 and the bracket 52 being spaced from the flange 50 a distance slightly greater than the diameter of socket 9. These brackets, together with the rear wall and flanges, define a main compartment for the reception of sockets 2 to 8, and a pair of end compartments for the reception of sockets 1 and 9, respectively.

Each of the brackets 51 and 52 is provided with an opening adjacent to its top edge for the reception of one end of the extension member 42, the shape of the opening preferably conforming to the cross section of the extension member. These openings are located above the tops of the sockets in the main and end compartments so that the extension member 42, when in place, holds the sockets within the compartments, as shown in Fig. 7. The nib 43 and the spring-pressed ball 44 on the end of the extension member 42 are effective to lock the extension member in position on the tops of the sockets. The rear wall of the container is provided with spaced brackets 54 and 55 adapted to support the operating handle 41, and an intermediate bracket 56 is provided between the brackets 54 and 55, the body portion of the bracket 56 extending about the central part of the handle 41, as shown in Fig. 8. The bracket 56 carries a set screw 57 which is engageable with the handle 41 to lock it in position.

The embodiment shown in Figs. 9 and 10 is somewhat similar to the previously described embodiments, the particular tool set being of the same type as is shown in my Patent No. 1,826,739 and the container being similar to those previously described. In this particular embodiment the end walls 60 and 61 and the bottom wall 62 are provided with retaining flanges 64, 65 and 66, respectively. Each end wall is provided with an opening adjacent to its upper edge for the reception of the ends of the extension 42 which holds the sockets 1 to 8 in place. A single outstanding bracket 67 is provided in place of the brackets 54 and 55, shown in the previously described embodiment, for supporting the operating handle 41 and a bracket 68 secured to the rear wall 63 adjacent to one end of the bracket 67, the bracket 68 being provided with a set screw 69 engageable with one end of the handle 41 to lock it in position.

An auxiliary tool set and holder therefor is secured to the rear wall of the main container adjacent to its top edge, this auxiliary container being similar in construction to the main container and the tool set being of the type above referred to.

While I have shown and described different desirable embodiments of the invention, it is to be understood that this disclosure is for the purpose of illustration only and that various changes in shape, proportion, and arrangement of parts, as well as the substitution of equivalent elements for those herein shown and described may be made without departing from the spirit and scope of the invention as set forth in the appended claims.

I claim:

1. A container for a multiple socket wrench set including a plurality of operating handles or the like adjuncts, said container comprising a casing for holding the sockets, means for locking one of the operating handles in a position to hold said sockets in place, a pair of brackets for supporting another of said operating handles, and a set screw carried by one of said brackets for locking the latter operating handle in place.

2. A container for a compound tool set which includes an elongate member and a plurality of tool elements, said container comprising a frame having a longitudinal wall and spaced transverse walls defining a compartment adapted to receive certain of the tool elements in side by side relation, the transverse walls being constructed and arranged to support said elongate member in a position to retain said tool elements disposed in said compartment in fixed position, spaced brackets defining a wall for confining said elongate member in position on said transverse walls, said brackets also supporting another part of said tool set, releasable means for locking said elongate member in position, and releasable means for locking said part of said tool set in position.

3. A container for a multiple socket wrench set including a plurality of operating handles or the like adjuncts, said container comprising a frame having a longitudinal wall and spaced transverse walls defining a compartment adapted to receive said sockets in side by side relation, the transverse walls being constructed and arranged to support one of said operating handles in position to retain said sockets in fixed position, spaced brackets defining a retaining member for confining said operating handle in position on said transverse walls, said brackets also supporting a second operating member, releasable means for locking said operating handle in position, and releasable means for locking said operating member in position.

4. A container for a multiple socket wrench set including a plurality of operating handles or the like adjuncts, said container comprising a frame having longitudinal rear and bottom walls and transverse walls adjacent to the ends of said longitudinal walls defining a compartment adapted to receive the sockets in side by side relation, the upper ends of said transverse walls being shaped and arranged to hold one of said operating handles in a position to retain said sockets in position within said compartment, a plurality of spaced brackets formed along said rear wall for receiving another of said operating handles, and a set screw carried by one of said brackets for locking the last-mentioned operating handle in position.

5. A container for a multiple socket wrench set including a plurality of operating handles or the like adjuncts, said container comprising a frame having longitudinal rear and bottom walls and transverse walls adjacent to the ends of said longitudinal walls defining a compartment adapted to receive the sockets in side by side relation, the upper ends of said transverse walls being shaped and arranged to hold one of said operating handles in a position to retain said sockets in position within said compartment, spaced brackets formed along the upper edge of said rear wall and defining a second compartment for receiving another of the operating handles, and a set screw carried by each of said brackets, one set screw being operative to lock the first operating handle in position and another set screw being operative to lock the second operative handle within said second compartment.

6. A container for a multiple socket wrench set including a plurality of operating handles or the like adjuncts, said container comprising a frame having longitudinal rear and bottom walls and transverse walls adjacent to the ends of said longitudinal walls defining a compartment adapted to receive the sockets in side by side relation, the upper ends of said transverse walls being shaped and arranged to hold one of said operating handles in a position to retain said sockets in position within said compartment, a bracket disposed along said rear wall above said compartment for supporting a second operating handle, another bracket depending from adjacent the upper end of said rear wall and cooperating with the first bracket to hold said second handle in position, and a set screw carried by one of said brackets for locking said second handle in position.

WILLIAM F. COSTELLO.